United States Patent [19]

Heidjann

[11] Patent Number: 4,565,056
[45] Date of Patent: Jan. 21, 1986

[54] SELF-PROPELLED HARVESTER THRESHER

[75] Inventor: Franz Heidjann, Harsewinkel, Fed. Rep. of Germany

[73] Assignee: Claas OHG, Harsewinkel, Fed. Rep. of Germany

[21] Appl. No.: 517,923

[22] Filed: Jul. 27, 1983

[30] Foreign Application Priority Data

Jun. 21, 1983 [DE] Fed. Rep. of Germany ....... 3227975

[51] Int. Cl.⁴ ............................................. A01D 47/00
[52] U.S. Cl. ...................................... 56/14.4; 56/15.8; 56/208
[58] Field of Search ...................... 56/10.2, 14.3, 14.4, 56/15.8, 15.9, 208, 210, DIG. 10, DIG. 15, 187, 14.6

[56] References Cited

U.S. PATENT DOCUMENTS 4,206,583 6/1980 Week et al. ........................... 56/208
4,409,778 10/1983 McNaught ............................ 56/208

Primary Examiner—Gene Mancene
Assistant Examiner—David I. Tarnoff
Attorney, Agent, or Firm—Michael J. Striker

[57] ABSTRACT

A self-propelled harvester thresher has a liftable and lowerable front inclined transporting channel, as considered in a travelling direction, and a cutting table connected therewith and having a rear wall mounted on the transporting channel, wherein a cutter bar, a drawing roller, and a winch are liftably and lowerably connected with said rear wall.

17 Claims, 3 Drawing Figures

SELF-PROPELLED HARVESTER THRESHER

BACKGROUND OF THE INVENTION

The present invention relates to a self-propelled harvester thresher with a liftable and lowerable front inclined transporting channel, as considered in a transporting direction, and a cutting table directly or indirectly mounted thereon.

Harvester threshers of the above mentioned general type are provided with wide and heavy cutting tables in order to obtain a maximum throughput. The problem with such large cutting tables is that, in the event of cutting height adjustment during use on the field, great masses must be lifted and lowered. This is performed in many cases by cylinder-and-piston units which lift or lower the inclined transporter and the cutting table connected therewith either manually or under the control of a soil feeler. High moments are generated in this case, so that the harvester thresher, particularly with an empty grain tank, starts to tilt about its front drive axle. In addition to the thus assumed inconvenient travelling condition for the driver, the material is loaded very strongly which leads to premature wear phenomena. These advantages take place particularly clearly in the foreground when between the inclined transporter of a harvester thresher and the cutting table an axial thresing and separating unit is provided, whereby the masses to be overcome are considerably increased.

SUMMARY OF THE INVENTION

Accordingly, it is an object of the present invention to provide a self-propelled harvester thresher which avoids the disadvantages of the prior art.

More particularly, it is an object of the present invention to provide a harvester thresher which favorably satisfies the requirement in the sense of the movement of smaller masses during the cutting height adjustment and in the sense of a simple and robust construction.

In keeping with these objects and with others which will become apparent hereinafter, one feature of the present invention resides, briefly stated, in a harvester thresher in which the cutting table is composed of a rear wall mounted on the inclined transporting channel, and the cutter bar, the drawing roller, and the winch are liftably and lowerably connected with the rear wall.

In the harvester thresher designed in accordance with the present invention, lower masses must be moved during cutting height adjustment.

For maintaining the movable masses as low as possible, the bottom of the cutting table is composed of a plurality of arms which are pivotably mounted on the rear wall and arranged at a distance from one another. These distances are covered by a flat bottom sheet. Both outer arms are liftable and lowerable independently of one another.

It is advantageous when the cutter bars are connected with the front, freely extending ends of the arms. In the thus formed cutting table bottom, it can be lifted only at one side which is also of advantage particularly in the event of one-sidedly occurring hindrances or during threshing on slopes. During slope threshing, because of the displaced center of gravity, the harvester thresher with its wheels located at the downward side of the slope are pressed into the field soil farther than the wheels which face toward the peak side.

In a structurally simple manner, the rear edges of the arms are supported in consoles, and the consoles are mounted in the lower region of the rear wall on a shaped strip connected with the rear wall.

For preventing changes of the position of the drawing roller relative to the cutting table bottom and to the cutting table rear wall or the stripping-off strips, each of the outer arms is provided with a carrying arm which carries the drawing roller, and the bearing point of the carrying arms lies on the arms substantially underneath the pins of the drawing roller. A lever is pivotally connected with each bearing pin of the drawing roller and has ends which face away from the pins and articulately connected with the rear end. Their connecting points lie close to the stripping-off strip for the screw blade.

In accordance with another feature of the present invention, the carrying arms are connected via pins with the piston rods of cylinder-and-piston units. The cylinders of the cylinder-and-piston units are held outwardly and in the lower region of the rear wall by the latter in a turnable manner. For this purpose the shaped strips carry at their outer ends carrying pieces in which holding rings are suspended in a half-cardan manner for receiving the cylinder-and-piston units.

For adjusting the winch independently of the cutting height adjustment, and therefore guaranteeing an optimum drawing, cylinder-and-piston units which operate independently of one another are connected with the upper ends of the carrying arms. The piston rods of these cylinder-and-piston units engage with the lifting arms for the winch, and the lifting arms are supported at their one end in consoles connected with the rear wall and carry at their other ends the winch.

For making the work of the driver of the harvester thresher as easy as possible, it is recommended to provide both outer arms with soil filler, wherein the cylinder-and-piston units are actuated independently of one another in dependence upon the distance between the outer arms and the field soil determined by the soil feelers.

In accordance with still another feature of the present invention, the cylinder-and-piston units operate in opposite directions relative to one another.

The cylinder-and-piston units which serve for displacement of the winch are actuatable in advantageous manner independently of the actuation of the cylinder-and-piston units for the cutting height adjustment.

The soil pressure of the cutting table is preselectable in a known manner by spring means provided in the harvester thresher.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
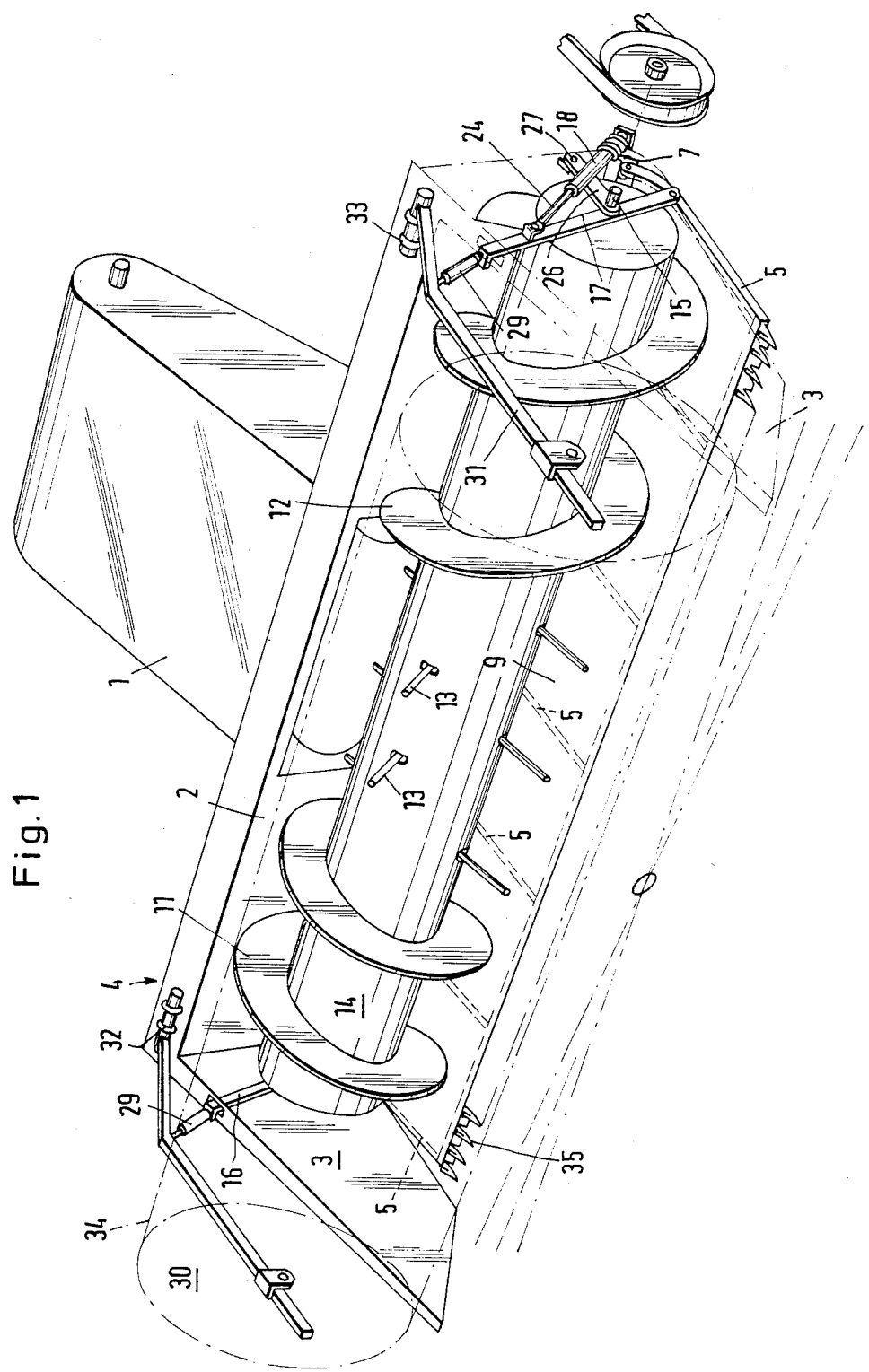
FIG. 1 is a perspective view of a cutting table of a self-propelled harvester thresher in accordance with the present invention.

An inclined transporting channel of a self-propelled harvester thresher in accordance with the present invention is identified with reference numeral 1. A rear wall 2 with lateral walls 3 of a cutting table 4 is connected with the inclined transporting channel 1 by not shown quick couplings.

The bottom of the cutting table is formed by a plurality of arms 5 which are arranged at a distance relative to one another and turnably supported with the one end in consoles 6. The consoles 6 are carried on a throughgoing shaped strip 7 which is mounted on a lower longitudinal edge 8 of the rear wall 2. The arms 5 are connected by a bottom sheet 9 which lies on the arms 5 and connects them with one another. A guiding sheet 10 with a wave-shaped cross section can be placed additionally, if needed, on the bottom sheet 9. It improves drawing-in, particularly of grain, and moreover stabilizes the bottom.

Figure 2:
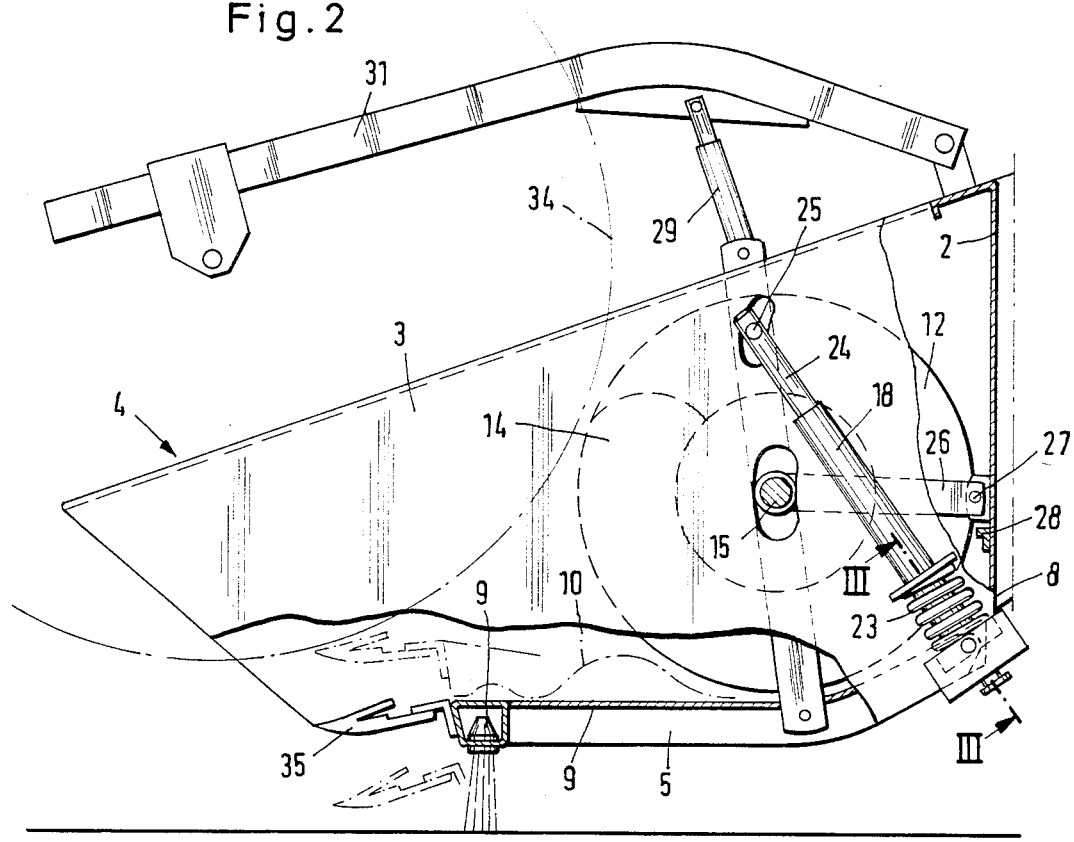
FIG. 2 is a side view of the cutting table shown in FIG. 1 on an enlarged scale.
Figure 3:
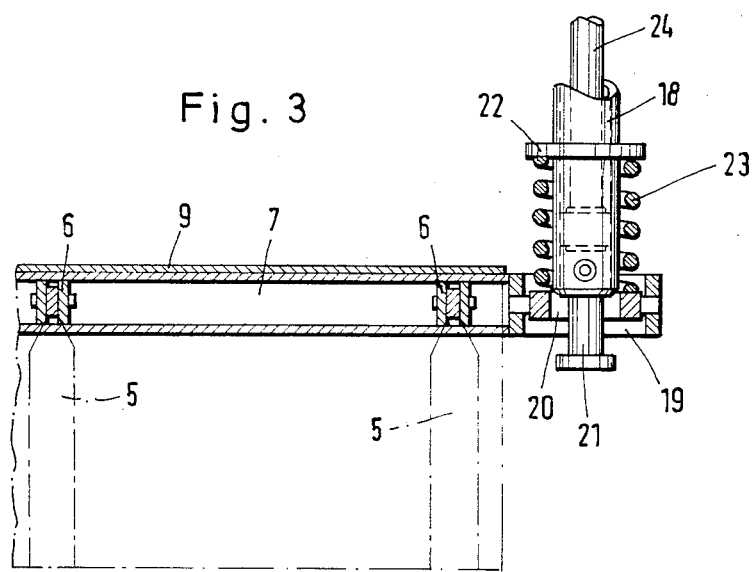
FIG. 3 is a view showing a section taken along the line III—III in FIG. 2.

As can be seen from FIGS. 1 and 2, a drawing roller 14 which is provided with screw blades 11 and 12 and with controlled drawing fingers 13 has two bearing pins 15 arranged at its end sides. The bearing pins 15 are supported in two carrying arms 16 and 17. The carrying arms 16 and 17 are turnably connected at their one end with both outer arms 5. The bearing arms 16 can be lifted or lowered by two cylinder-and-piston units 18. For this purpose a carrying piece 19 is welded at each end of the shaped strip 7 and receives a swinging holding ring 20. The holding ring 20 guides an extension 21 of the cylinder of the cylinder-and-piston unit 18. An abutment ring 22 is fixedly connected with the cylinder-and-piston unit 18. A pressure spring 23 abuts at its one end against the abutment ring 22 and presses with its other end against the holding ring 20. A piston rod 24 of the cylinder-and-piston unit 18 is provided at its upper end with a pin 25 which is connected at its end projecting outwardly of the piston rod 24 with the carrying arm 16 or 17.

As can be clearly seen from FIG. 2, the bearing pins 15 of the drawing roller 14 are supported in addition to these carrying arms 16 and 17, also in two levers 26. The levers 26 are movably connected with the rear wall 2. Since the bearing point 27 is located near a stripper strip 28, it is guaranteed that the distance of the stripper strip 28 to the screw blades 11 and 12 during actuation of one or two cylinder-and-piston units 18 changes only insignificantly and the transportation of material to the drawing fingers 13 is not hindered.

Cylinder-and-piston units 29 are mounted on the upper end of the carrying arms 16 and 17. The piston rods of the cylinder-and-piston units 29 carry both lifting arms 30 and 31 for a winch 34. The lifting arms are pivotally supported at their one end in consoles 32 and 33.

A cutter bar 35 of the table 34 is mounted on the turnable arms 5. Both outer arms 5 carry respectively a soil feeler 36 which in the present embodiment is formed as an ultrasound feeler.

The operation of the respective units is not described here in detail, since it corresponds to the operation of the respective units of known harvester threshers.

It will be understood that each of the elements described above, or two or more together, may also find a useful application in other types of constructions differing from the types described above.

While the invention has been illustrated and described as embodied in a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvester thresher, comprising a liftable and lowerable front inclined transporting channel as considered in a travelling direction; a cutting table connected with said transporting channel and having a rear wall mounted on the latter; and working means including a cutter bar, a drawing roller having a plurality of pins, and a winch liftably and lowerably connected with said rear wall, said cutting table having a bottom composed of a plurality of arms which are turnably supported on said rear wall and arranged at a distance from one another, said plurality of arms including two outer arms which are liftable and lowerable independently of one another, each of said outer arms having a carrying arm which carries said roller and has a bearing point on said carrying arm, located substantially beneath said pins of the drawing roller.

2. A self-propelled harvester thresher as defined in claim 1; and further comprising bottom sheet means overlapping the distances between said plurality of arms and including at least one bottom sheet.

3. A self-propelled harvester thresher as defined in claim 2, wherein said bottom sheet means includes a plurality of bottom sheets which are arranged in a row transverse to the travelling direction.

4. A self-propelled harvester thresher as defined in claim 2, wherein each of said plurality of arms has a front freely extending end, said cutter bar being connected with said front end of said arm.

5. A self-propelled harvester thresher as defined in claim 2, wherein each of said plurality of arms has a rear end, said rear wall having a lower region; and further comprising a shaped strip connected with the lower region of said rear wall, and a plurality of consoles mounted on said shaped strip and supporting the rear ends of said plurality of arms.

6. A self-propelled harvester thresher, comprising a liftable and lowerable front inclined transporting channel as considered in a travelling direction; a cutting table connected with said transporting channel and having a rear wall mounted on the latter and having a lower region; working means including a cutter bar, a drawing roller having a plurality of pins, and a winch liftably and lowerable connected with said rear wall, said cutting table having a bottom composed of a plurality of arms which are turnably supported on said rear wall and arranged at a distance from one another, said plurality of arms having a rear end and including two outer arms which are liftable and lowerable independently of one another, each of said outer arms having a carrying arm which carries said roller and has a bearing point on said carrying arm, located substantially beneath said pins of the drawing roller; sheet means overlapping the distances between said plurality of arms and including at least one bottom sheet; a shaped lower strip connected with said lower region of said rear wall; and a plurality of consoles mounted on said shaped strip and supporting the rear end of said plurality of arms.

7. A self-propelled harvester thresher as defined in claim 1; and further comprising a stripping-off strip, and a lever pivotally connected with a respective one of said pins of said drawing roller and having an end which faces away from said pin and pivotally connected with said rear wall, each of said levers having a pivot point which is located close to said stripping-off strip.

8. A self-propelled harvester thresher as defined in claim 1; and further comprising cylinder-and-piston units each having a piston rod arranged so that said carrying arm is connected with said piston rod via a pin, and a cylinder pivotally held outwardly and in said rear wall.

9. A self-propelled harvester thresher as defined in claim 1, wherein said rear wall has a lower region; and further comprising a shaped strip connected with said lower region of said rear wall, said shaped strip having outer ends provided with a carrying piece and a holding ring which hangs in said carrying piece in a half-caran manner for receiving said cylinder-and-piston units.

10. A self-propelled harvester thresher as defined in claim 1, wherein said carrying arms have upper ends; and further comprising further cylinder-and-piston units connected with said upper ends of said carrying arms and having piston rods, lifting arms engaged by said piston rods of said cylinder-and-piston units, and consoles connected with said rear wall, said lifting arms having one end supported in said consoles and another end carrying said winch.

11. A self-propelled harvester thresher as defined in claim 2; and further comprising a soil feeler provided on each of said outer arms.

12. A self-propelled harvester thresher as defined in claim 8; and further comprising a soil feeler provided on each of said outer arms, each of said cylinder-and-piston units being actuatable in dependence upon a distance between said outer arms and the soil measured by said soil feelers.

13. A self-propelled harvester thresher as defined in claim 8, wherein said cylinder-and-piston units are actuatable independently of one another.

14. A self-propelled harvester thresher as defined in claim 8, wherein said cylinder-and-piston units are actuatable in opposite directions relative to one another.

15. A self-propelled harvester thresher as defined in claim 10, wherein said further cylinder-and-piston units are actuatable independently of the actuation of said first-mentioned cylinder-and-piston units.

16. A self-propelled harvester thresher as defined in claim 1; and further comprising spring means arranged to select the soil pressure of said cutting table.

17. A self-propelled harvester thresher as defined in claim 1; and further comprising a shaped sheet connected with said cutter bar of said bottom of said cutting table and providing a favorable material drawing and a transverse stability.

* * * * *